J. B. ENTZ.
ELECTRORESPONSIVE REGULATOR.
APPLICATION FILED DEC. 2, 1911.

1,125,279.

Patented Jan. 19, 1915.

Witnesses

Inventor
Justus B Entz
by
Augustus B Stoughton
his
Attorney

UNITED STATES PATENT OFFICE.

JUSTUS B. ENTZ, OF CLEVELAND, OHIO, ASSIGNOR TO THE ELECTRIC STORAGE BATTERY COMPANY, OF PHILADELPHIA, PENNSYLVANIA, A CORPORATION OF NEW JERSEY.

ELECTRORESPONSIVE REGULATOR.

1,125,279.  Specification of Letters Patent.  Patented Jan. 19, 1915.

Original application filed October 28, 1910, Serial No. 589,584. Divided and this application filed December 2, 1911. Serial No. 663,493.

*To all whom it may concern:*

Be it known that I, JUSTUS B. ENTZ, a citizen of the United States, and a resident of Cleveland, in the State of Ohio, have invented certain new and useful Improvements in Electroresponsive Regulators, of which the following is a specification.

My invention relates to systems in which a storage battery is connected in parallel with a generating source for regulating the fluctuations of a varying load, and in which there is present controlling apparatus for causing the battery to take these fluctuations. As usually designed such controlling apparatus throws practically all of the load fluctuations on the battery whether they be large or small, thus maintaining a practically steady load on the generating source. In many cases, however, the generating source can readily take the load fluctuations up to a certain point, and it will prove more efficient to allow the source to take these fluctuations, provided the fluctuations beyond this point are referred to the battery. My invention comprises simple and efficient means for producing this result.

Figure 1:
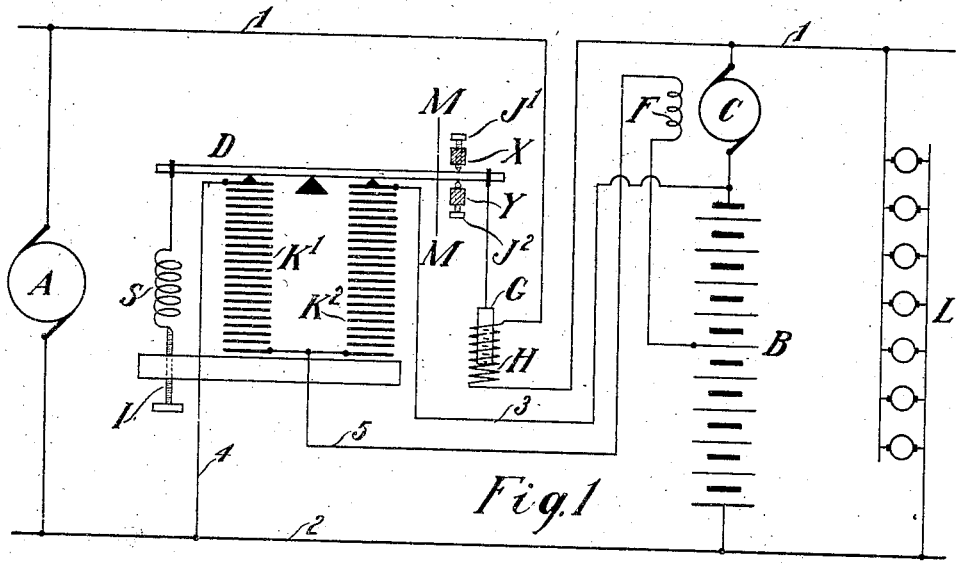
Figure 2:
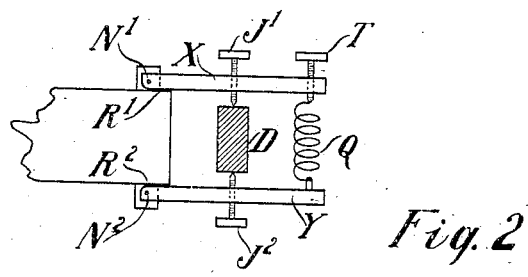

In the accompanying drawings, Figure 1, illustrates diagrammatically a system of distribution embodying my invention, and Fig. 2 is a section taken on the line M M of Fig. 1 and drawn to an enlarged scale.

Referring to Fig. 1, A is a generating source connected to the circuit 1—2 supplying fluctuating load L. B is a storage battery and C its regulating booster connected in series across circuit 1—2. The field F of the booster is controlled by a carbon regulator, which is a well known piece of apparatus, consisting of two piles of carbon disks $K^1$ and $K^2$ subjected to varying pressure by means of the lever D which bears on the two piles, and is pivoted at a point between them. The pressure exerted by the lever on the piles is controlled by the spring S at one end, adjusted by means of the screw I, and by the pull of a solenoid H at the other end connected into the circuit 1 between the generator and the battery, whose soft iron core is suspended from the end of the lever D. The two piles $K^1$ and $K^2$ are connected in series across the battery terminals by means of conductors 3 and 4, while the field F of the booster is connected by means of conductor 5 into a circuit from the middle point of the battery to a point midway between the two piles $K^1$ and $K^2$. Variations of pressure on the piles will cause current to flow in one direction or the other through the field F to compel the battery to charge and discharge in response to small variations of current in the coil H. The described application of the carbon regulator is but one of its applications, and my invention is not limited to any particular application, or necessarily to a carbon regulator and I desire to claim my invention for all uses to which it is applicable.

The operation of the lever D on the carbon piles is according to my invention modified by two pivotal bars shown in section at X and Y in Fig. 1, and more clearly illustrated in Fig. 2 which is a side view of them showing the lever D in section along the line M M of Fig. 1. Referring to Fig. 2, the bars X and Y are supported respectively above and below the lever D, and are pivoted respectively at the points $N^1$ and $N^2$. The other ends of the bars X and Y are drawn together by means of the spring Q which is adjusted by the screw T. Normally these two bars are held by the spring Q against the faces $R^1$ and $R^2$ of their common support. Adjusting screws $J^1$ and $J^2$ are shown passing through the arms X and Y and abutting against the lever D from above and below respectively. These two screws should be adjusted so that under conditions, when the pull of the solenoid H due to the average load on generator A is just balanced by the spring S (in Fig. 1) the two screws $J^1$ and $J^2$ will just make contact with the lever D without exerting any appreciable pressure thereon. Were it not for the apparatus shown in Fig. 2 any small increase or decrease of load on the source A would vary the pressure on the carbon piles and cause the battery to discharge or charge to compensate for the variations of load at L. With the apparatus of Fig. 2 adjusted as above described, before the lever can exert any change of pressure on the carbon piles, the increase of current in the coil H must be sufficient to overcome the tension of the spring Q. When the current in the coil H has increased to that extent the lever D will be drawn down rocking the lever arm Y sufficiently to permit increasing pressure on the carbon pile $K^2$ and relieving that on $K^1$ thus producing the usual regulating effect. The arm X will be prevented from following the motion of the lever D as it rests against the surface or stop $R^1$. If on the other hand, the load on the source A should decrease below the average for which the spring S is adjusted, this decrease must continue until the decrease in pull of the solenoid H is sufficient to offset the tension of the spring Q, and permit the spring S to pull the lever D to raise the bar X, and thus increase the pressure on the pile $K^1$ and decrease that on $K^2$, thereby causing the battery to charge; the arm Y resting on its stop $R^2$. It will be seen, therefore, that a certain zone of fluctuations on the source A is established within which the regulator is held inactive. Whenever the fluctuations pass this zone in either direction, the regulator acts as usual to throw substantially all of the balance of the fluctuations on the battery. The amplitude of this zone may be adjusted by adjusting the tension of the spring Q.

This application is a division of my application Serial No. 589,584, filed October 28th, 1910. In that application I have included claims directed to the combination of the regulator with other apparatus described, while in this I desire to claim features of the regulator itself, viz:—

In an electric regulator the combination of a movable part for operating the regulator, a controlling spring for the movable part, a pair of movable arms arranged on opposite sides of said part, a second controlling spring connecting the arms, and a fixed stop for each arm, whereby the action of said movable part is controlled by the algebraic sum of the spring tensions.

In testimony whereof, I have hereunto signed my name.

JUSTUS B. ENTZ.

Witnesses:
Wm. Wayne Chase,
J. M. Mahon.